United States Patent
Kormann et al.

(10) Patent No.: US 9,232,688 B2
(45) Date of Patent: Jan. 12, 2016

(54) COMBINATION OF A TRACTOR AND AN IMPLEMENT

(75) Inventors: Georg Kormann, Zweibruecken (DE); Uwe Vollmar, Zweibruecken (DE)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 13/876,762

(22) PCT Filed: Sep. 21, 2011

(86) PCT No.: PCT/EP2011/066409
§ 371 (c)(1),
(2), (4) Date: Mar. 28, 2013

(87) PCT Pub. No.: WO2012/041743
PCT Pub. Date: Apr. 5, 2012

(65) Prior Publication Data
US 2013/0186657 A1 Jul. 25, 2013

(30) Foreign Application Priority Data
Oct. 1, 2010 (DE) .................... 10 2010 041 885

(51) Int. Cl.
*A01B 69/00* (2006.01)
*A01B 69/06* (2006.01)

(52) U.S. Cl.
CPC .............. *A01B 69/004* (2013.01); *A01B 69/005* (2013.01)

(58) Field of Classification Search
USPC ......... 172/282–285, 288, 324–328, 605, 677, 172/679
See application file for complete search history.

(56) References Cited

U.S. PATENT DOCUMENTS

| | | | | |
|---|---|---|---|---|
| 2,316,397 A * | 4/1943 | Briscoe | .......................... | 280/463 |
| 4,077,651 A * | 3/1978 | Steinbach et al. | ............. | 280/426 |
| 4,098,346 A * | 7/1978 | Stanfill et al. | .................. | 172/283 |
| 4,418,518 A * | 12/1983 | Koch et al. | ....................... | 56/228 |
| 4,433,533 A * | 2/1984 | Giani | .............................. | 56/341 |
| 4,463,811 A | 8/1984 | Winter | | |
| 4,838,358 A * | 6/1989 | Freudendahl | .................. | 172/125 |
| 4,905,466 A * | 3/1990 | Heppner | .......................... | 56/364 |
| 5,107,663 A * | 4/1992 | Wattron et al. | ................. | 56/15.7 |
| 5,240,079 A | 8/1993 | Schmidt | | |
| 5,335,856 A * | 8/1994 | Nathan | .......................... | 239/164 |

(Continued)

FOREIGN PATENT DOCUMENTS

| | | |
|---|---|---|
| DE | 102009028409 A1 | 2/2011 |
| DE | 102010041885 A1 | 4/2012 |

(Continued)

OTHER PUBLICATIONS

Electrohydraulic Propulsion Implemented on a John Deere Windrower. Product brochure [online]. Purdue University, 2005 [retrieved Mar. 13, 2015]. Retrieved from the Internet: <URL: https://engineering.purdue.edu/ABE/InfoFor/CurrentStudents/SeniorProjects/2005/2005posters/harmeyer/applegateharmeyer.pdf>.

*Primary Examiner* — Matthew D Troutman

(57) ABSTRACT

A combination of a tractor and an implement is pulled by the tractor. A draw bar is coupled to the tractor so as to be pivotable about a vertical axis. The implement is supported on the ground by wheels and comprises a cultivating element for cultivating a field. A control device is usable to activate a first actuator with which the a position of the draw bar is changeable in relation to the implement, where the control device can be operated in order to activate the first actuator in such a manner that the latter adjusts the draw bar with the effect of moving the implement toward the outside of a curve.

10 Claims, 3 Drawing Sheets

(56) References Cited

U.S. PATENT DOCUMENTS

| | | | |
|---|---|---|---|
| 5,642,607 A * | 7/1997 | Stephenson et al. | 56/15.1 |
| 6,044,633 A * | 4/2000 | Stiefvater et al. | 56/16.4 R |
| 6,283,222 B2 | 9/2001 | Gengler et al. | |
| 6,360,516 B1 * | 3/2002 | Harkcom et al. | 56/15.5 |
| 6,381,935 B1 * | 5/2002 | Wattron et al. | 56/14.9 |
| 6,434,462 B1 | 8/2002 | Bevly et al. | |
| 6,546,708 B2 * | 4/2003 | Faivre | 56/15.2 |
| 6,553,925 B1 | 4/2003 | Beaujot | |
| 6,612,102 B2 * | 9/2003 | Walch et al. | 56/192 |
| 6,662,540 B1 * | 12/2003 | Harkcom et al. | 56/228 |
| 6,688,403 B2 * | 2/2004 | Bernhardt et al. | 172/2 |
| 6,804,587 B1 | 10/2004 | O'Connor et al. | |
| 6,865,465 B2 | 3/2005 | McClure | |
| 7,147,241 B2 | 12/2006 | Beaujot et al. | |
| 7,162,348 B2 * | 1/2007 | McClure et al. | 701/50 |
| 7,373,231 B2 * | 5/2008 | McClure et al. | 701/50 |
| 7,383,114 B1 * | 6/2008 | Lange et al. | 701/50 |
| 7,580,783 B2 * | 8/2009 | Dix | 701/50 |
| 7,647,755 B2 * | 1/2010 | Barnett et al. | 56/14.9 |
| 7,658,056 B2 * | 2/2010 | Thompson et al. | 56/15.8 |
| 7,689,354 B2 * | 3/2010 | Heiniger et al. | 701/412 |
| 7,784,558 B2 | 8/2010 | Mozingo | |
| 7,904,226 B2 * | 3/2011 | Dix | 701/50 |
| 8,131,432 B2 * | 3/2012 | Senneff et al. | 701/50 |
| 8,190,364 B2 * | 5/2012 | Rekow | 701/466 |
| 8,244,442 B2 | 8/2012 | Craig et al. | |
| 8,346,443 B2 * | 1/2013 | Senneff et al. | 701/50 |
| 8,359,141 B1 * | 1/2013 | Lange | 701/50 |
| 8,565,984 B2 | 10/2013 | Mayfield et al. | |
| 8,577,558 B2 | 11/2013 | Mitchell | |
| 8,639,416 B2 * | 1/2014 | Jones et al. | 701/41 |
| 8,649,930 B2 * | 2/2014 | Reeve et al. | 701/24 |
| 2003/0208311 A1 | 11/2003 | McClure | |
| 2004/0124605 A1 * | 7/2004 | McClure et al. | 280/456.1 |
| 2007/0029099 A1 * | 2/2007 | Barnett et al. | 172/328 |
| 2009/0032273 A1 | 2/2009 | Hahn | |
| 2010/0017075 A1 | 1/2010 | Beaujot | |
| 2011/0100657 A1 | 5/2011 | Connors et al. | |
| 2011/0112721 A1 | 5/2011 | Wang et al. | |
| 2012/0232760 A1 | 9/2012 | Hubalek | |
| 2012/0240546 A1 | 9/2012 | Kormann | |
| 2013/0046446 A1 | 2/2013 | Anderson | |
| 2013/0110358 A1 | 5/2013 | Merx et al. | |

FOREIGN PATENT DOCUMENTS

| | | |
|---|---|---|
| EP | 1266553 A2 | 12/2012 |
| WO | 2008005195 A2 | 1/2008 |
| WO | 2012041743 A1 | 4/2012 |

* cited by examiner

COMBINATION OF A TRACTOR AND AN IMPLEMENT

FIELD OF INVENTION

This invention relates to a combination of a tractor and an implement which is pulled by the tractor.

BACKGROUND ART

There are many applications in agriculture in which drawn implements are pulled behind tractors to move the implements over a desired path in order, for example, to pick up crop from a field, to mechanically cultivate the soil of a field or to discharge materials over a field. The tractor is customarily steered by a driver, and the implement attached to a coupling of the tractor by means of a draw bar follows the tractor. In particular in the case of relatively large tractors and implements, the dimensions of the tractor/implement combination, in particular the length of the draw bar of the implement, mean that a relatively large amount of space is required when turning in the headland. Because the headland has to be configured to be of an appropriate size; accordingly, a large area of the field for growing crops is lost. In addition, the soil is undesirably compacted on the headland which is traveled over relatively frequently. Attempts to reduce the size of the headland by means of greater steering angles of the tractor may result in damage if the drawbar or the implement collides with the tractor.

It has been proposed to provide a baler with a steerable drawbar or steerable wheels in order to automatically steer said baler in the lateral direction over a swath and to obtain bales which are as cylindrical as possible (e.g., U.S. Pat. No. 4,433,533). Furthermore, mounted implements having wheels driven by electric motor are also known (e.g., German Patent Application No. DE 196 23 738 A1). The wheels are driven according to the Ackermann condition, i.e. all of the wheels transmit identical forces.

German Patent Application No. DE 197 46 927 A1 proposes a soil-cultivating implement, in which the draw bar is mounted pivotably on the frame of the implement and the movement of the draw bar is transmitted in a mechanical, electric or hydraulic manner to a steerable main wheel. In this case, the main wheel is locked in the direction in which the draw bar moves, which leads to an improvement in the cornering characteristics.

European Patent Application No. EP 1 336 549 A1 describes a drawn agricultural distributing machine with a positively steered draw bar and wheels which are steered by assigned actuators and are activated by means of a controller in such a manner that the implement precisely follows the track of the tractor.

However, the turning circle of the implement is not positively influenced, i.e. with the effect of reducing the size thereof, by either solution, in particular if regions of the implement may collide with the tractor.

Finally, couplings on tractors have been proposed, which couplings are adjusted actively in the lateral direction by an actuator in order to move the implement over a desired path and, for example, to compensate for the downward slip on lateral slopes (e.g., U.S. Pat. No. 7,162,348).

However, during turning, the turning circle of the combination of tractor and implement is increased further by the activation of the coupling in relation to an implement without active steering.

SUMMARY

In one embodiment, this disclosure relates to a combination of a tractor and an implement which is pulled by the tractor. The combination comprises a draw bar coupled to the tractor so as to be pivotable about a vertical axis. The implement is supported on the ground by wheels and comprises a cultivating element for cultivating a field. A control device is usable to activate a first actuator with which the a position of the draw bar is changeable in relation to the implement, where the control device can be operated in order to activate the first actuator in such a manner that the latter adjusts the draw bar with the effect of moving the implement toward the outside of a curve.

BRIEF DESCRIPTION OF THE DRAWINGS

An exemplary embodiment of the invention that is described in more detail below is illustrated in the drawings, in which.

DETAILED DESCRIPTION OF EMBODIMENT(S)

Figure 1:
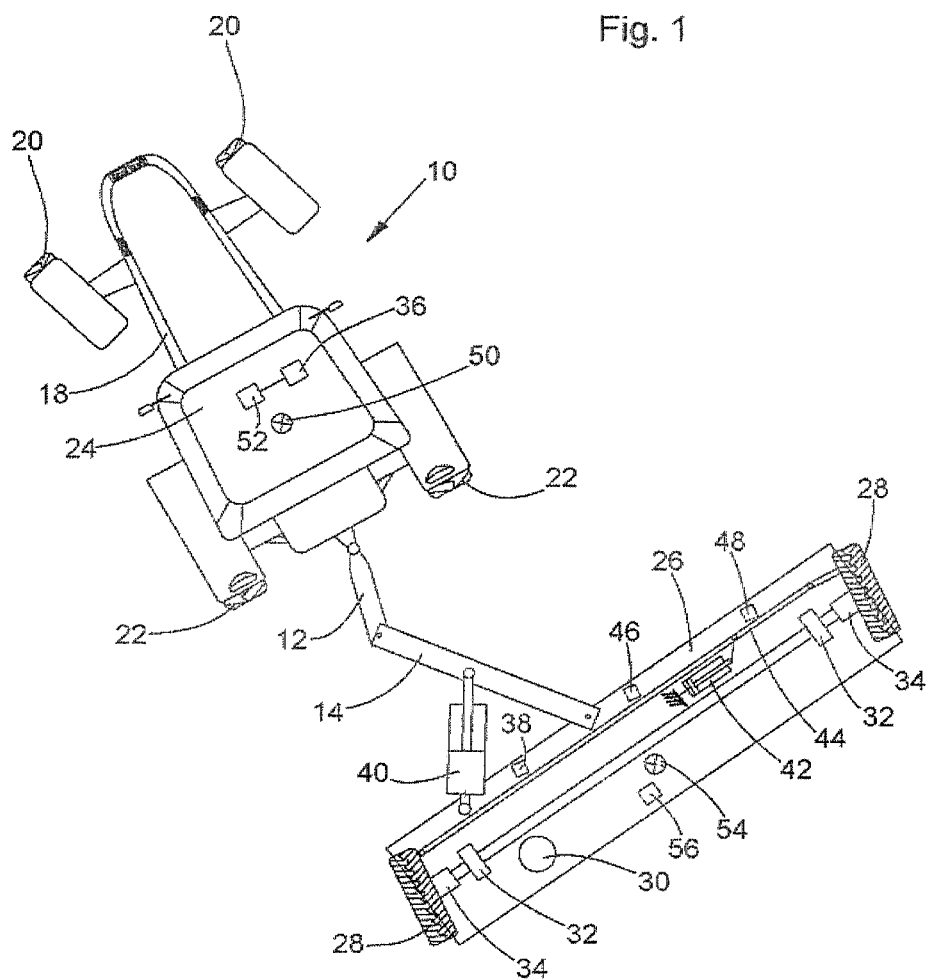
FIG. 1 shows a top view of a tractor with a pulled implement.

In one embodiment, this disclosure relates to a combination of a tractor and an implement which is pulled by the tractor. The combination comprises a draw bar coupled to the tractor so as to be pivotable about a vertical axis. The implement is supported on the ground by wheels and comprises a cultivating element for cultivating a field. A control device is usable to activate a first actuator with which the a position of the draw bar is changeable in relation to the implement, where the control device can be operated in order to activate the first actuator in such a manner that the latter adjusts the draw bar with the effect of moving the implement toward the outside of a curve. For example, the invention may provide a combination of a tractor and a drawn implement with a reduced turning circle at the end of the field.

A combination is composed of a tractor and an implement pulled by the tractor. The implement is pulled by a draw bar of the tractor, is supported on the ground by wheels and comprises at least one cultivating element interacting with a field. For example, the cultivating element comprises a crop lifter, soil-cultivating tools or a spray linkage. Furthermore, there is a control device which may be located on board the tractor or the implement or may be distributed spatially over both. The control device is connected to a first actuator which serves to adjust the angle between the draw bar and the implement. The first actuator may be arranged between the draw bar and a chassis of the implement (for direct adjustment of the draw bar in relation to the implement) or between the tractor and the draw bar (for indirect adjustment of the draw bar in relation to the implement). The control device activates the actuator actively in such a manner that the implement is moved toward the outside of a curve during cornering. The effect achieved by this activation is that the turning circle of the implement can be controlled to approximately correspond to the turning circle of the tractor. Therefore, the tractor, when turning in the headland, no longer—as in the case of passively steered implements customary in the prior art—has to take into consideration the fact that the implement describes smaller arcs than the tractor. The implement no longer has to describe larger turning 5 circles than otherwise possible in order to avoid collisions, but rather, by contrast, can travel through tighter corners. In other words, by active activation of the draw bar, the implement is brought into the outside of a curve into a position in which there need be no 10 concern that there will be collisions with the tractor.

The control device is preferably coupled to a second actuator which serves for steering the wheels, i.e., for adjusting the angle thereof about the vertical axis. The control device, likewise, steers the wheels in the direction of the outside of a curve. In this case, a single actuator can be assigned to a plurality of wheels (two or more wheels) that can be mechanically connected to the actuator, or each wheel is assigned a dedicated actuator, wherein the actuators can then be activated synchronously or differently in each case by the control device.

The wheels of the implement may be driven actively, whether by means of a mechanical drive train of the tractor or by assigned electric or hydraulic motors. As an alternative or in addition, they may be provided with brakes. The drives and/or brakes of the wheels arranged on both sides of the implement are preferably activatable differently by the control device in such a manner that they assist a steering movement. If the wheels are steered to the right, the left wheel accordingly rotates more rapidly than the right wheel which, in an extreme situation, may even rotate backwards in order to achieve the desired steering effect. The brakes can analogously assist said steering movement.

In a simple embodiment of the invention, the steering angle of the tractor is predetermined by the operator, customarily by means of a steering wheel. The control device can detect the steering angle by means of a sensor and activate the first and optionally the second actuator taking into consideration the steering angle.

Secondly, there is also the possibility of providing the tractor with an automatic steering device which guides the tractor automatically along a desired path. For this purpose, a separate steering control unit or the control device can be charged with data for a desired path, for example a stored map with a route plan, and with data with regard to the current position of the tractor, and can supply a steering device of the tractor with steering signals. Said steering data are then also available to the control device in order, on the basis thereof, (or the position of the implement or tractor), to activate the first and optionally the second actuator.

Furthermore, the control device is expediently connected to feedback sensors for detecting the position of the actuators and/or of the wheels or/and the draw bar and/or of a position-determining device mounted on the implement and activates the first and/or second actuator depending on the signals of at least one of the above-mentioned feedback sensors. Accordingly, a closed control loop is provided, the control loop ensuring that the implement also actually moves on a desired path. Even in the event of unfavorable soil conditions, the feedback by the position-determining device mounted on the implement ensures that a desired path is maintained. Furthermore, the control device can also be connected to a sensor for detecting the inclination of a lateral slope in order to compensate for the downhill slip by corresponding activation of the first and/or second actuator. The signals of the sensor for detecting the inclination of the lateral slope can also serve in a manner known per se for compensating for a vertical offset between the position-determining device of the implement and the ground.

The control device may activate the first and optionally the second actuator permanently, i.e. during the entire field work, depending on the steering angle of the tractor. It would also be possible to design said activation to be able to be switched on and off by an operator, or to automatically switch on said activation (in particular on the basis of a position-determining device and a field plan) only when traveling through a headland and otherwise to switch said activation off. In the case of a switched-off activation of the actuators depending on the steering angle, it is appropriate to bring the first and optionally the second actuator automatically into a neutral position for straight ahead travel. This position is also expedient during reversing and when traveling on a road, in particular in the event of a plurality of implements suspended one behind another, and may optionally be selected by operator input or automatically.

When the tractor and the implement turn at the end of a field, the implement is first of all still moving in a straight ahead direction on the field while the tractor already reaches the headland and carries out a steering movement. However, the first and optionally the second actuator are adjusted only when the implement has also reached the headland. For these reasons, the control device preferably activates the first and optionally the second actuator in a temporally or locally delayed manner in relation to the steering movement of the tractor. The activation can be implemented on the basis of a displacement measurement and taking into consideration the distance between the front wheels of the tractor and the implement, or on the basis of detecting the position of the implement or detecting the time between the tractor and the implement reaching the headland.

FIG. 1 shows a top view of an agricultural tractor 10 and of an implement 16, which is coupled to a trailer coupling 12 of the tractor 10 by means of a draw bar 14 so as to be pivotable about the vertical axis, in the form of any type of soil-cultivating implement. The tractor 10 is constructed on a supporting frame 18 which is supported on steerable front wheels 20 and drivable rear wheels 22 and bears a cab 24 in which there is an operator workstation.

The implement 16 comprises a chassis 26 which is supported on the ground via steerable wheels 28, and cultivating elements 30 in the form of circular spike harrows for cultivating the field soil. The mechanical drive of the cultivating elements 30 of the implement 16 is derived from the tractor 10 via a power take-off shaft although a drive by means of electric motors which are supplied with electric power by the tractor 10 would also be conceivable. The wheels 28 are also driven by electric motors 32 via propeller shafts 34.

A control device 36 (which could be designed in the form of a display device or on-board computer) is located on board the tractor 10, but could also be localized on board the implement 16. The control device 36 is connected via a valve arrangement 38 to a first actuator 40 in the form of a hydraulic cylinder which is coupled at one end to the draw bar 14, which is coupled to the implement 16 so as to be pivotable about the vertical axis, and at the other end to the chassis 26. In addition, the control device 36 is connected via the valve arrangement 56 to a second actuator 42 in the form of a hydraulic cylinder which is coupled to a rod 44 for pivoting the wheels 28 of the implement 16 about the vertical axis. By means of feedback sensors 46, 48, the control device 36 is informed about the current angle of the draw bar 14 and the wheels 28.

A position-determining device 50 is mounted on the roof of the cab 24 of the tractor 10 in the form of an antenna for receiving a satellite-based position-determining system (for example GPS), which position-determining device is connected to the control device 36 which outputs a steering signal to a steering device 52 of the tractor, said steering device, in turn, adjusting the steerable front wheels 20 of the tractor via a suitable actuator (not shown) in such a manner that the longitudinal center axis of the tractor 10 is guided at least approximately on a predetermined line.

A further position-determining device 54 is located on the implement 16, on the longitudinal center axis thereof. The position-determining device 54, like a lateral inclination sensor 56 of the implement 16, is connected to the control device 36. The position-determining device 50 could also operate locally, i.e., could detect the field with a camera or with laser range-finding, and a suitable evaluation software differentiates between cultivated and uncultivated regions of the field. The position-determining device 54 could also be omitted if a sensor detects the angle between the draw bar 14 and the trailer coupling 12. The manner of operation of the control device 36 is now explained with reference to FIG. 2 and FIG. 4.

Figure 2:
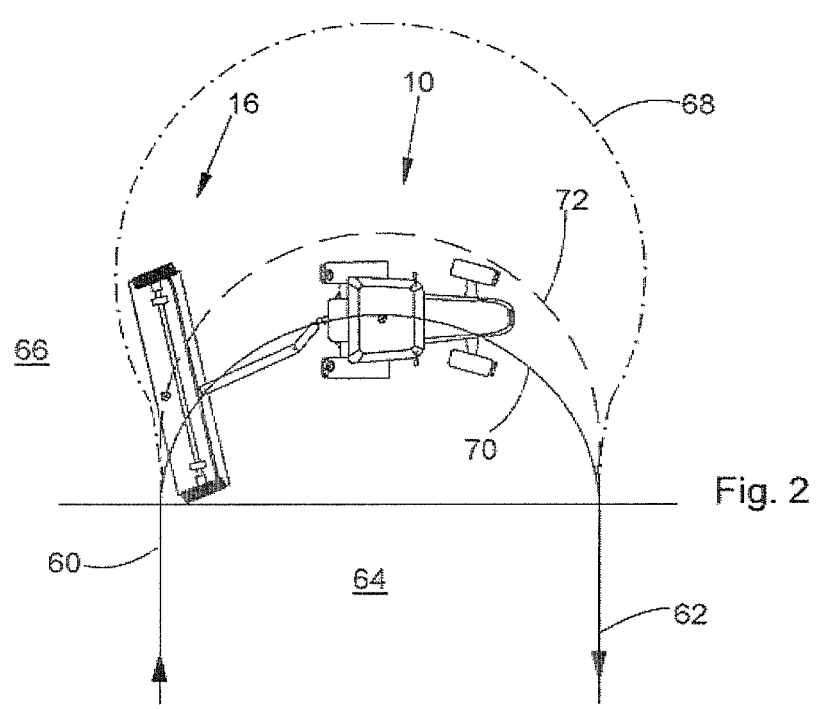
FIG. 2 shows a top view of the tractor and the implement when turning in the headland.
Figure 4:
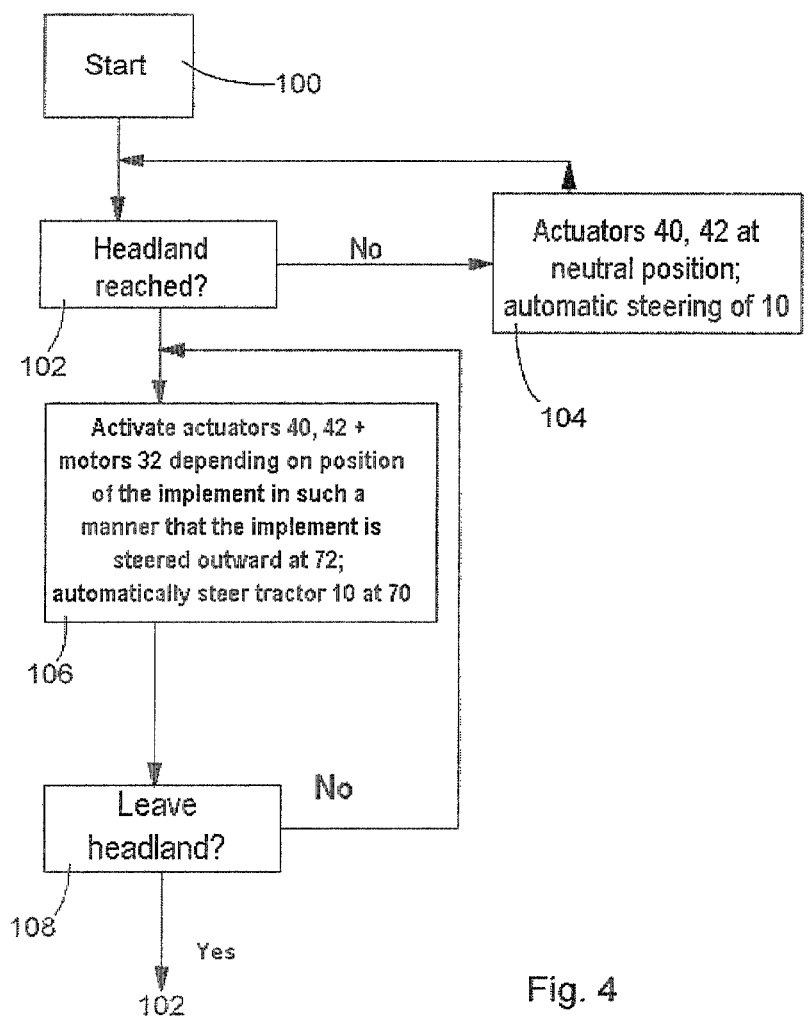
FIG. 4 shows a flow diagram according to which the control device operates during turning at the end of the field.

FIG. 2 shows two parallel tracks 60, 62 on a field and the turning operation of the tractor 10 with the implement 16 in a headland 66. A previously customary track of a tractor 10 with a conventional implement 16, i.e. an implement which is not actively steered, is indicated by 68. The track 68 is keyhole-shaped and describes a relatively large circle which prevents the pulled implement 16, which describes a tighter circle than the tractor 10, from colliding with the latter. FIG. 4 shows a flow diagram according to which the control device 36 operates during turning at the end of the field.

After the start in step 100, it is first of all queried with reference to the position of the tractor 10 as is detected by the position-determining device 50 and a stored plan of the field 64, of the headland 66 and of the track 60, 62 to be traveled whether the tractor 10 has already reached the headland 66. If this is not the case, step 104 follows, in which the actuators 40, 42 are set to the neutral position thereof for straight-ahead travel of the implement 16 and the tractor 10 is guided on the track 60 by the steering device 52.

If it is established in step 102 that the tractor 10 has reached the headland 66, step 106 follows, in which the signals of the position-determining device 54 are used to guide the implement 16, by activation of the actuators 40, 42 (and optionally different activation of the two motors 32 of the implement), on an approximately circular path 72 through the headland 66, said path having a slightly larger radius than an approximately circular path 70 on which the tractor 10 is automatically guided on the basis of the signals of the position-determining system 50. The implement 10 is accordingly moved in the direction of the outside of the curve by the actuator 40 and the draw bar 14, and also by the steering of the wheels 28 by means of the actuator 42 (cf. the positions in FIG. 1: in the event of a steering movement of the tractor 10 to the left, the wheels 28 steer to the right and the draw bar 14 is also moved to the right) and preferably by means of the rotational speed controller of the motors 32. In this case, use is made of the signals of the feedback sensors 46 and 48 to bring the actuators 40, 42 into respectively stored positions which are retrieved from a memory of the control device 36 on the basis of the particular position along the path 72. This avoids a collision with the tractor 10, and smaller turning circles 70, 72 than in the prior art can be traveled through.

It should also be noted that the cultivating elements may be raised in the headland 66, for which purpose they may be raised in relation to the chassis 26 by actuators (not shown) and/or the chassis 26 may be raised in relation to the ground by raising the wheels 28 by means of actuators (not shown). Analogously, the cultivating elements 30 are brought again into the operating position upon reaching the field 64 again.

Step 106 is followed by step 108 in which it is queried whether the headland 66 has been left. If this is not the case, step 106 follows again, otherwise step 102.

The signals of the inclination sensor 56 are used to compensate for the vertical offset between the position-determining device 54 and the ground when traveling along lateral slopes, such that the implement 16 is always moved on the predetermined paths 60, 72, 62, and slipping down of the implement because of the lateral slope is compensated for, this being able to be undertaken, when traveling along the track 60, 62, by a corresponding steering movement of the tractor 10 or (differently from that illustrated in FIG. 4) by suitable activation of the actuators 40, 42 and/or of the motors 32.

Figure 3:
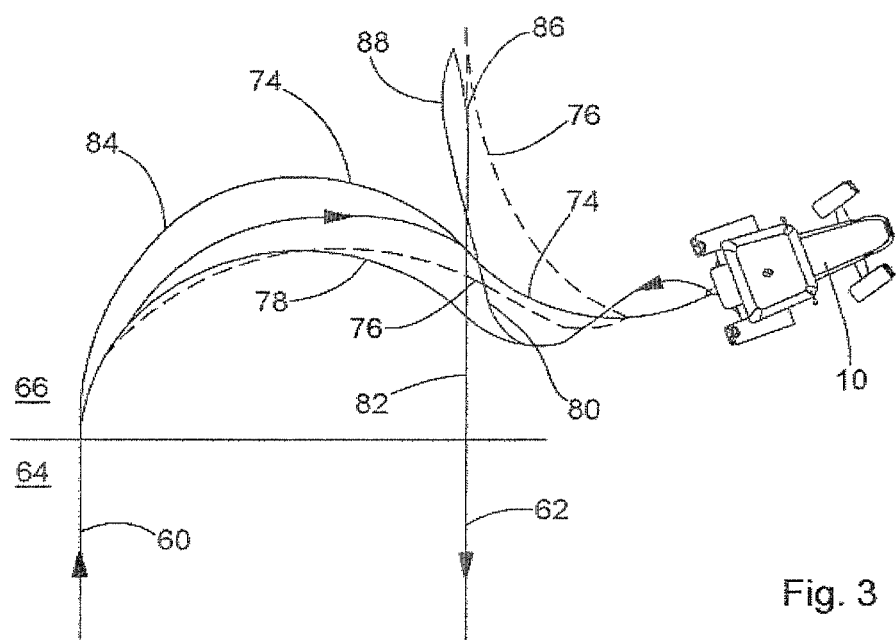
FIG. 3 shows a top view of the tractor and the implement when turning in the headland with reversing.

FIG. 3 illustrates an alternative turning operation in the headland 66, in which the tractor 10 and the implement 16 in the meantime execute a reversing movement. A path traveled during such a turning operation by a conventional tractor 10 and implement 16 without active steering is indicated by 74 (tractor) and 76 (implement). The implement 76 also follows a wide path here in the headland 66 in the longitudinal direction of the track 60, 62. The paths according to the invention are indicated by 78 to 82 (tractor 10) and 84 to (implement 16).

Said paths are substantially shorter than in the prior art and are each composed of three sections, wherein the second section 80, 86 is traveled backwards. Analogously to the embodiment according to FIG. 2, the actuators 40, 42 and optionally the motors 32 and the steering device 52 are activated by the control device 36 in such a manner that the desired paths are followed. In this case, the implement 16 is guided further outwards on the curves than the tractor 10. The stopping between the sections and the reversing can be carried out by the driver of the tractor 10 (after receiving a corresponding optical or acoustic instruction by the control device 36) or by the control device 36 by intervention in the driving controller of the wheels.

The invention claimed is:

1. A combination of a tractor and an implement which is pulled by the tractor, the combination comprising:
   a position-determining device for determining a position of a the tractor or the implement relative to a field;
   a draw bar coupled to the tractor so as to be pivotable about a vertical axis;
   the implement supported on the ground by implement wheels and comprising a cultivating element for cultivating a field;
   a control device usable to activate a first actuator with which a position of the draw bar is changeable in relation to the implement, the first actuator coupled pivotably between the drawbar and a chassis of the implement, where the control device can activate the first actuator in such a manner that the first actuator adjusts the draw bar with the effect of moving the implement toward an outside of a curve to reduce a turning radius of the combination if the determined position is established in a headland or an end of the field in accordance with a stored plan of the field.

2. The combination as claimed in claim 1, wherein the control device is connected to a second actuator which is designed for adjusting an angle of one or more of the implement wheels about the vertical axis, and in that the control device can be operated in order to activate the second actuator in such a manner that the second actuator steers the implement wheels toward the outside of the curve.

3. The combination as claimed in claim 1, further comprising:
   an electric drive comprising an electric motor associated with each of the implement wheels for differential activation at different rotational speeds by the control device to assist the moving of the implement.

4. The combination as claimed in claim 3, wherein the electric drive or a brake of each of the implement wheels is activatable differently by the control device with the effect of supporting a steering movement of the draw bar.

5. The combination as claimed in claim 1 wherein a steering angle of the tractor is predeterminable manually or automatically and the control device can be acted upon by a signal with regard to the actual or desired value of the steering angle of the tractor and can be operated in order to activate the actuator or the actuators taking into consideration an actual or desired value of the steering angle or the determined position of the implement or tractor.

6. The combination as claimed in claim 5, wherein the control device can be acted upon with desired displacement information and, by the position-determining device, with information with regard to a current position of the tractor.

7. The combination as claimed in claim 1 wherein the control device is connected to feedback sensors for detecting the position of the first actuator or of the wheels or the draw bar, or to the position-determining device mounted on the implement, or to a sensor for detecting the inclination of a lateral slope, and the control device can be operated in order to activate the first actuator or a second actuator depending on the signals of at least one of the above-mentioned sensors.

8. The combination as claimed in claim 1 wherein the control device can be operated in order to activate the first actuator and a second actuator, permanently or depending on an operator input or automatically only when traveling over a headland taking into consideration a steering angle of the tractor, and otherwise to bring the first actuator and the second actuator into a neutral position.

9. The combination as claimed in claim 1 wherein the control device can be operated in order to activate the first actuator and a second actuator in a temporally or locally delayed manner in relation to steering of the tractor.

10. A method for moving a combination of a tractor and an implement which is pulled by the tractor by a draw bar coupled to the tractor so as to be pivotable about a vertical axis, is supported on the ground by wheels and comprises a cultivating element for cultivating a field, over a field, the method comprising:
  determining a position of a the tractor or the implement;
  activating, by a control device, a first actuator with which a position of the draw bar is changed in relation to the implement, the first actuator coupled pivotably between the drawbar and a chassis of the implement;
  taking into consideration a steering angle of the tractor in such a manner that the first actuator adjusts the draw bar to move the implement toward an outside of a curve to reduce a turning radius of the combination if the determined position is established in a headland or an end of the field in accordance with a stored plan of a field.

* * * * *